Aug. 12, 1941.  A. B. SIMON  2,252,142
AIR CONDITIONING SYSTEM
Filed Oct. 3, 1938
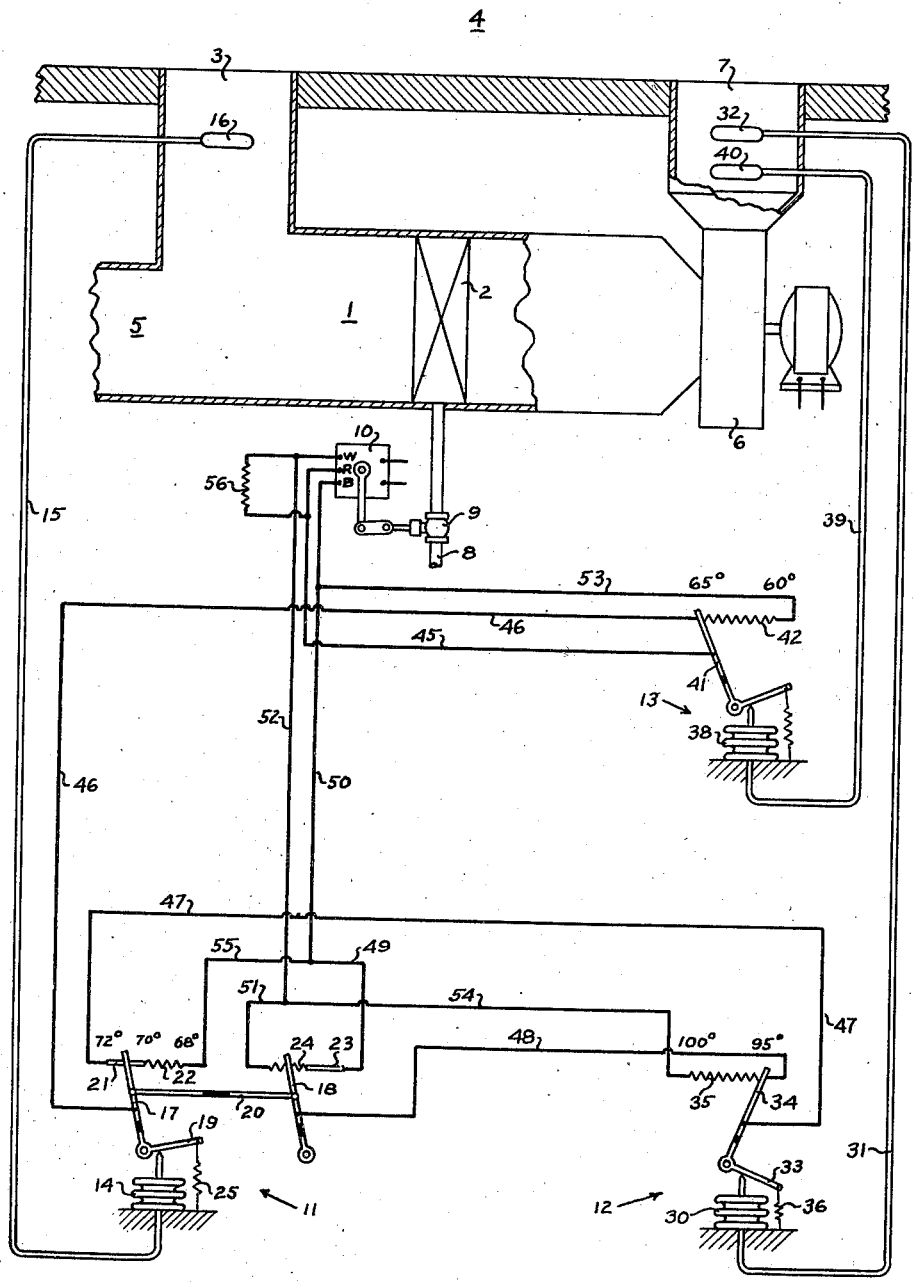
Inventor
Andrew B. Simon
By
*George H Fisher*
Attorney Patented Aug. 12, 1941

2,252,142

UNITED STATES PATENT OFFICE 2,252,142

AIR CONDITIONING SYSTEM

Andrew B. Simon, Cleveland, Ohio, assignor to Minneapolis-Honeywell Regulator Company, Minneapolis, Minn., a corporation of Delaware Application October 3, 1938, Serial No. 232,943

13 Claims. (Cl. 236—37)

This invention relates in general to air conditioning and is more particularly concerned with the provision of automatic controls therefor.

In systems for heating large spaces such as auditoriums it has been found that the air tends to stratify, the hot air collecting adjacent the ceiling and colder air being adjacent the floor line. This is quite objectionable as it causes overheating of the balcony and underheating of the orchestra. One manner for avoiding this undesirable result is by limiting the temperature of the hot air being discharged into the space so that it does not rise rapidly. This permits the air temperature throughout the entire space to be substantially equalized. However, this limiting of the discharge air temperature during extreme cold weather may cause underheating of the space. Also this limiting of the discharge air temperature limits the rate of heat supply to the space and consequently prolongs the time necessary for heating the space from a low value desired when the space is unoccupied to the higher value necessary when the space is occupied.

It is an object of this invention to provide a control system for applications of this type which prevents the temperature of the heated air delivered to the space from rising above a predetermined value when the space temperature is at the desired value thereby avoiding stratification of the air within the space, and which automatically raises the temperature of the delivered air to a higher value upon fall in space temperature from the desired normal value. More broadly stated, it is an object of this invention to provide a control system in which a space condition controller controls a condition changer subject to the control of a high limit controller but which reduces the effect of the high limit controller as the space condition varies from the desired vlaue.

A further object of this invention is the provision of a condition controlling system in which a space condition controller controls a condition changer subject to high and low limit controllers and which places one of the limit controllers out of control or varies its effect when the space condition varies to a predetermined value.

Other objects of this invention will appear from the following description and the appended claims.

For a full disclosure of my invention reference is made to the following detailed description and to the accompanying drawing, the single figure of which diagrammatically indicates an air blast heating system having a control system embodying this invention.

Reference character 1 indicates an air conditioning chamber which contains a heating coil 2. This chamber is connected by a return air duct 3 to a space 4 which is being heated. This chamber is also connected to a fresh air duct 5 which supplies air for ventilation purposes. A fan 6 is connected to the other end of chamber 1 for drawing air across the heating coil 2 and discharging it to the space 4 through a discharge duct 7.

Steam or other heating medium may be supplied to the coil 2 by means of a pipe 8 having a valve 9 interposed therein. This valve may be actuated by means of a proportioning motor 10 which may take the form shown and described in the Taylor Patent 2,028,110. This motor is controlled by means of a space thermostat 11, a high limit discharge thermostat 12 and a low limit discharge thermostat 13.

Referring to the thermostat 11, this thermostat may include a bellows 14 which is attached by capillary tube 15 to a control bulb 16 located within the return air duct 3. The bellows, tube, and bulb are charged with a suitable volatile fill for causing the pressure within bellows 14 to vary in accordance with changes in return air temperature. The bellows 14 actuates a pair of sliders 17 and 18. The actuating mechanism for the sliders 17 and 18 is diagrammatically illustrated as including an actuating arm 19 which is engaged by bellows 14 and which directly actuates the slider 17. The slider 18 is actuated in unison with the slider 17 by means of an insulated link 20. The slider 17 cooperates with a contact strip 21 and a resistance 22 while slider 18 cooperates with a contact strip 23 and a resistance 24. This thermostat 11 may be so designed and adjusted that when the return air temperature is at 72° F. or above, the slider 17 engages the left-hand end of contact strip 72 while the slider 18 engages the left-hand end of resistance 24. As the space temperature falls below 72° F., the pressure within the bellows 14 will decrease which permits a biasing spring 25 to shift sliders 17 and 18 to the right across the contact strip 21 and the resistance 24, respectively. When the space temperature falls to 70° F., the slider 17 will engage the left-hand end of resistance 22 and the slider 18 will engage the right-hand end of resistance 24. Upon further fall in temperature, the slider 17 will contact resistance 22 and the slider 18 will engage the contact strip 23. When the space temperature falls to 68° F., the slider 17 will engage the right-hand end of resistance 22.

The high limit temperature controller 12 may consist of a bellows 30 which is connected by a tube 31 with a control bulb 32 located in discharge duct 7. This bellows may actuate a bell-crank lever including an actuating arm 33 and a slider 34 which cooperates with a resistance 35. The actuating arm 33 is biased against the bellows 30 by a spring 36. This instrument may be so designed and adjusted as to cause the slider 34 to engage the right-hand end of resistance 35 when the discharge temperature is at or below 95° F., while causing the slider 34 to engage the left-hand end of resistance 35 when the discharge temperature is at or above 100° F.

The low limit discharge controller 13 may be formed similarly to the controller 12 and includes a bellows 38 which is connected by a tube 39 to a control bulb 40 located in the discharge duct 7. This thermostat also includes a slider 41 which is actuated by bellows 38 and which cooperates with a resistance 42 to form a potentiometer. This controller may be designed and adjusted in a manner to cause the slider 41 to engage the left-hand end of resistance 42 when the discharge temperature is at or above 65° F. while engaging the left-hand end of said resistance when the discharge temperature falls to 60° F.

Upon reference to the Taylor Patent 2,028,110, it will be found that the proportioning motor 10 is provided with a three-wire control circuit. In the drawing the motor control terminals are indicated as R, W, and B. This motor is adapted to assume positions depending upon the relative values of resistances which are connected between terminals R and W and R and B. For example, if equal amounts of resistance are connected between terminals R and W and between terminals R and B, the motor 10 will assume mid position in which the valve 9 is half open. However, as the resistance between terminals R and B is decreased without corresponding decrease in resistance between terminals R and W, the motor 10 will operate in a direction to open the valve 9 an amount proportionate to the unbalancing of the resistances. Conversely, if the resistance between terminals R and W is decreased without corresponding decrease in resistance between terminals R and B, the motor 10 will operate to close valve 9 an amount proportionate to the unbalancing of the resistances connected across the control terminals.

Referring to the wiring between the motor 10 and the various controllers it will be noted that terminal R is connected by wire 45 to the slider 41 of low limit controller 13. The left-hand end of resistance 42 is connected by wire 46 to the slider 17 of return air thermostat 11. The contact strip 21 of this thermostat is connected by wire 47 to the slider 34 of the high limit controller 12, and the right-hand end of resistance 35 of this controller is connected by wire 48 to the slider 18 of thermostat 11. With the various controllers in the positions shown, the discharge temperature is above 65° F. and below 95° F., as indicated by the slider 41 of thermostat 13 engaging the left-hand end of resistance 42, and the slider 34 of the high limit thermostat 12 engaging the right-hand end of resistance 35. The space or return air temperature is approximately 71° F. as indicated by the slider 18 of the thermostat 11 engaging the center of the resistance 24. For this position of slider 18 the slider 17 is engaging the contact strip 21. With the controllers in the positions shown, the terminal R of motor 10 is directly connected to the slider 18 of thermostat 11 as follows: terminal R, wire 45, slider 41, wire 46, slider 17, contact strip 21, wire 47, slider 34, and wire 48 to slider 18. It will be noted that the contact strip 23 is connected to terminal B of motor 10 by wires 49 and 50, while the resistance 24 is connected to terminal W of motor 10 by wires 51 and 52. Therefore with the parts in the positions shown, the slider 18 of thermostat 11 is connected to terminal R, the resistance 24 is connected to terminal W and the contact strip 49 is connected to terminal B. This causes the slider 18 to divide the resistance 24, the left half of this resistance being connected between terminals R and W, and the right half of this resistance being connected between terminals R and B. The resistance connected between terminals R and W is therefore equal to the resistance connected between terminals R and B, which causes the motor 10 to assume mid position in which the valve 9 is half open. If the space temperature should increase, the slider 18 of thermostat 11 will shift to the left along resistance 24 which decreases the portion of this resistance connected between terminals R and W and increases the portion of this resistance connected between terminals R and B. This will cause the motor 10 to close valve 9 an amount proportionate to the position of the slider 18 on resistance 24. When the space temperature reaches 72° F. terminals R and W of the motor 10 will be substantially short-circuited thus causing the motor 10 to place valve 9 in closed position. Upon decrease in space temperature, the slider 18 will be shifted to the right across resistance 24 thus decreasing the portion of this resistance which is connected between terminals R and B while increasing the portion connected between terminals R and W. This will cause motor 10 to open valve 9 proportionately to the fall in space temperature. When the space temperature falls to 70° F., the slider 18 will engage the right-hand end of resistance 24 for opening valve 9 wide.

From the foregoing description it should be apparent that when the discharge temperature is between the settings of the limit controllers 12 and 13, the potentiometer controller of thermostat 11 formed of slider 18, resistance 24, and contact strip 23 will be placed in complete control of the valve motor 10, and this controller will operate to open the valve graduatingly upon fall in space temperature and to close the valve graduatingly upon an increase in space temperature.

In mild weather only a small amount of heat will be required for maintaining the space temperature at the desired value, which may cause the thermostat 11 to tend to close valve 9 to such an extent that the discharge temperature falls below 65° F. This condition would be undesirable as the discharge of air at this temperature might cause uncomfortable drafts to occur in certain portions of the space being heated. In the event that the discharge temperature does fall below 65° F., the slider 41 of the low limit thermostat 13 will move to the right across resistance 42. It will be noted that the circuit previously traced between terminal R of motor 10 and the slider 18 of thermostat 11 passes through the slider 41. Consequently, as the slider 41 travels to the right across resistance 42, a portion of this resistance is inserted into the circuit between terminal R of the motor and the slider 18 of thermostat 11. This inserting of resistance into this circuit decreases the effect of the slider 18 upon the motor 10. It will also be noted that the right-hand end of resistance 41 is connected by wire 53 and wire 50 to terminal B of motor 10. Consequently when the slider 41 is in the position shown, the entire resistance 42 is in circuit between terminals R and B of motor 10. The slider 41 in shifting to the right along resistance 42, acts to decrease the portion of this resistance between terminals R and B. Therefore it will be seen that as the discharge temperature falls below 65° F., the slider 41 travels to the right across resistance 42 which decreases the effect of the thermostat 11 upon motor 10, and also decreases the resistance connected between terminals R and B. This will cause the motor 10 to open valve 9 for supplying heating medium to the coil 2 even though the space thermostat 11 may be satisfied. In this manner the low limit controller 13 acts to prevent the discharge temperature from falling below a predetermined value.

The high limit discharge thermostat 12 is provided in order to limit the temperature of the air passing to the space being heated. It has been found that if the air is discharged into a high space such as an auditorium at high temperature, this high temperature air will rise to the ceiling thus overheating the balcony while underheating the orchestra. By limiting this temperature, this undesirable stratification of the air within the space being heated is avoided.

In the event that discharge air should rise above 95° F. due to the space thermostat 11 opening the valve 9 too widely, the slider 34 of the high limit thermostat 12 will shift to the right along resistance 35. This will interpose a portion of the resistance 35 into circuit with the slider 18 of thermostat 11, and thus decrease the effect of this thermostat upon the valve motor 10. It will be noted that the left-hand end of resistance 35 is connected by wires 54 and 52 to terminal W of motor 10. Consequently when the slider 34 is in the position shown the entire resistance 35 is connected between terminals R and W of motor 10. The slider 34 in shifting to the right along this resistance therefore inserts a portion of this resistance in series with the thermostat 11, and also decreases the portion of this resistance which is connected between terminals R and W of motor 10. This causes this motor to operate in a direction for closing valve 9 for thus reducing the temperature of the discharge air. In this manner the high limit thermostat 12 operates to prevent the space thermostat from opening the valve 9 to such a point that the discharge air temperature rises above a predetermined value. As pointed out above, this prevents stratification of the air within the space being heated and thus provides for evenly heating such space.

When the space has been unoccupied and is being brought up to temperature for occupancy, the limiting of the air discharge temperature to a low value such as 95° or 100° F. will prevent the space temperature from being raised to normal within a short time. In order to avoid this undesirable result I have provided an arrangement for automatically rendering the high limit controller 12 inoperative at such times. This arrangement will now be described.

It will be noted that as the space temperature falls below 70° F. the slider 17 of thermostat 11 will begin shifting to the right along resistance 22. This will interpose a portion of the resistance 22 into circuit between terminal R of motor 10 and the slider 34 of the limit controller 12. This is due to the circuit between terminal R of motor 10 and the slider 34 of thermostat 12 being as follows: terminal R, wire 45, slider 41, wire 46, slider 17, resistance 22, contact strip 21 and wire 47 to slider 34. This interposing of resistance between terminal R of motor 10 and the slider 34 of the limit controller 12 will decrease the effect of this limit controller upon the motor 10. It will be noted that the right-hand end of resistance 22 is connected by wires 55 and 50 to terminal B. Due to the slider 17 being directly connected to terminal R, movement of this slider to the right along resistance 22 will decrease the portion of this resistance which is connected between terminals R and B. When the return air temperature falls to 68° F., a short circuit between terminals R and B of motor 10 will be established as follows: terminal R, wire 45, slider 41, wire 46, slider 17, wire 55, and wire 50 to terminal B. This will cause the valve 10 to be wide open irrespective of any action of the high limit controller 12. It will therefore be seen that as the space temperature falls below 70° F., the high limit controller 12 will gradually be cut out of the motor control circuit which renders it ineffective to prevent the discharge air temperature from rising above 95° F. Thus fall in space temperature between 70° F. and 68° F. acts to graduatingly raise the control point of the high limit thermostat 12 and when the space temperature falls to 68° F. the valve 9 will be wide open irrespective of the discharge temperature.

When the space is being heated up from a shut-down temperature to occupancy temperature, the high limit controller 12 will be prevented from having any effect upon the valve 9 so long as the space temperature is below 68° F. Thus during this period the valve 9 is wide open for supplying a maximum amount of heat to the space. As the space temperature rises above 68° F. the discharge thermostat 12 will be graduatingly replaced into the control circuit for thus permitting it to assume its function of limiting the discharge air temperature. This will cause the temperature of the discharge air to graduatingly lower as the space temperature reaches 70° F., and when the space temperature reaches 70° F. the thermostat 12 will be conditioned for preventing the discharge air temperature from rising above the control point of this thermostat. This graduatingly replacing of the thermostat 12 into control as the space reaches the desired value is very desirable for it acts to reduce stratification within the heated space and cause it to be evenly heated at the time the occupancy temperature is reached.

It will be noted that a resistance 56 is connected across terminals R and W at the motor 10. The purpose of this resistance is to balance out the control circuit when the various controllers are in their normal positions. It will be noted that with the controllers 11, 12 and 13 in the positions shown, resistances 22 and 42 are connected between terminals R and B while resistance 35 is connected between terminals R and W. Thus two resistances are connected between terminals R and B and only one between terminals R and W. By providing the additional resistance 56 which is of the same value as the other resistances, the circuit is completely balanced.

From the foregoing description it will be apparent that this invention provides a control system which controls the supply of heat to a space in accordance with space temperature and also controls the supply of heat in a manner to prevent the temperature of the discharge air from falling below a predetermined low value or rising above a predetermined high value, and which automatically raises the high limit value in the event that the space temperature falls below the setting of the space thermostat. It will also be apparent that the system of his invention provides for supplying heat to the space at maximum rate when the space is being heated for occupancy, and graduatingly places the limit controller in control as the space temperature approaches the desired normal value for thus avoiding stratification of the air at the time that the normal temperature is reached.

While throughout this description I have mentioned definite values of temperature at which the controls may operate, it will be understood that these values are illustrative only and may be varied for different applications and installations embodying this invention. Also while the invention has been described as applied to a heating system, it will be apparent that it is of broader scope and may be utilized in systems other than heating systems and for controlling other conditions than temperature. As various modifications of this invention will occur to those skilled in the art, I desire to be limited only by the scope of the appended claims.

I claim as my invention:

1. In a system for controlling the condition in a space, in combination, means for supplying conditioning medium to said space, condition changing means for controlling the condition of the medium supplied to said space, control means of the proportioning type responsive to the condition of the space being controlled, motor means of the proportioning type for controlling said condition changer, control line means between said control means and said motor means for rendering said control means effective to control said condition changer in a modulating manner, a low limit controller of the proportioning type connected into said control line means and responsive to the condition of the medium being supplied to said space for normally preventing the condition of said medium from falling below a predetermined value irrespective of said control means, a high limit controller of the proportioning type connected into said control line means and responsive to the condition of the medium being supplied for normally preventing the condition of the supplied medium from rising above a predetermined value, and means actuated in response to the condition in said space being controlled varying beyond a predetermined value for gradually reducing the effect of one of said limit controller.

2. In a system for controlling the condition in a space, in combination, means for supplying conditioning medium to said space, condition changing means for controlling the condition of the medium supplied to said space, control means responsive to the condition of the space being controlled, motor means for controlling said condition changer, control line means between said control means and said motor means for rendering said control means effective to control said condition changer, a high limit controller connected into said control line means and responsive to the condition of the medium being supplied for normally preventing the condition of the supplied medium from rising above a predetermined value, and means actuated in response to the condition in said space being controlled falling below a predetermined value for rendering said high limit controller means ineffective.

3. In a system for controlling the condition in a space, in combination, means for supplying conditioning medium to said space, condition changing means for controlling the condition of the medium supplied to said space, control means responsive to the condition of the space being controlled, motor means for controlling said condition changer, control line means between said control means and said motor means for rendering said control means effective to control said condition changer, a low limit controller responsive to the conditions of the medium being supplied to said space for normally preventing the condition of said medium from falling below a predetermined value irrespective of said control means, a high limit controller responsive to the condition of the medium being supplied for normally preventing the condition of the supplied medium from rising above a predetermined value, and means actuated in response to the condition in said space being controlled falling below a predetermined value for rendering said high limit controller ineffective to prevent the condition of said medium from rising above said predetermined value.

4. In a system for controlling the condition in a space, in combination, means for supplying conditioning medium to said space, condition changing means for controlling the condition of the medium supplied to said space, control means responsive to the condition of the space being controlled, motor means for controlling said condition changer, control line means between said control means and said motor means for rendering said control means effective to control said condition changer, a low limit controller connected into said control line means and responsive to the condition of the medium being supplied to said space for normally preventing the condition of said medium from falling below a predetermined value irrespective of said control means, a high limit controller connected into said control line means and responsive to the condition of the medium being supplied for normally preventing the condition of the supplied medium from rising above a predetermined value, and means actuated in response to the condition in said space being controlled falling below a predetermined value for rendering said high limit controller ineffective to prevent the condition of said medium from rising above said predetermined value.

5. In a system for changing the temperature of a space, in combination, means for supplying temperature changing medium to said space, means for varying the temperature of the temperature changing medium supplied, a thermostat responsive to the temperature of the space being controlled, motor means for controlling said temperature varying means, control line means between said thermostat and said motor means for rendering said thermostat effective to normally maintain the space temperature within predetermined limits, a high limit thermostat connected to said control line means for normally preventing said space thermostat from raising the temperature of the temperature changing medium above a predetermined value, and means actuated in response to the temperature in said space falling below a predetermined value for rendering said high limit thermostat ineffective.

6. In a system for changing the temperature of a space, in combination, means for supplying temperature changing medium to said space, means for varying the temperature of the temperature changing medium supplied, a thermostat responsive to the temperature of the space being controlled, motor means for controlling said temperature varying means, control line means between said thermostat and said motor means for rendering said thermostat effective to normally maintain the space temperature within predetermined limits, a low limit thermostat for normally preventing said space thermostat from reducing the temperature of the temperature changing medium below a predetermined value, a high limit thermostat for normally preventing said space thermostat from raising the temperature of the temperature changing medium above a predetermined value, and means actuated in response to the temperature in said space falling below a predetermined value for rendering said high limit thermostat ineffective to prevent the condition of said medium from rising above said predetermined value.

7. In a system for changing the temperature of a space, in combination, means for supplying temperature changing medium to said space, means for varying the temperature of the temperature changing medium supplied, a thermostat responsive to the temperature of the space being controlled, motor means for controlling said temperature varying means, control line means between said thermostat and said motor means for rendering said thermostat effective to normally maintain the space temperaure within predetermined limits, a low limit thermostat connected to said control line means for normally preventing said space thermostat from reducing the temperature of the temperature changing medium below a predetermined value, a high limit thermostat connected to said control line means for normally preventing said space thermostat from raising the temperature of the temperature changing medium above a predetermined value, and means actuated in response to the temperature in said space falling below a predetermined value for rendering said high limit thermostat ineffective to prevent the condition of said medium from rising above said predetermined value.

8. In a system for heating a space, in combination, means for passing a stream of air to said space, a heater for heating the air stream, motor means for varying the output of said heater, a thermostat responsive to the temperature of the space, control line means between said thermostat and said motor means for rendering said thermostat effective to control said heater, a high limit thermostat responsive to the temperature of the air heated by said heater and connected into said control line means for normally preventing the air passing to said space from rising above a predetermined temperature, and means actuated in response to the temperature in said space falling below a predetermined value for rendering said high limit thermostat ineffective.

9. In a system for heating a space, in combination, means for passing a stream of air to said space, a heater for heating the air stream, motor means for varying the output of said heater, a thermostat responsive to the temperature of the space, control line means between said thermostat and said motor means for rendering said thermostat effective to control said heater, a low limit thermostat responsive to the temperature of the air after passing through said heater and connected into said control line means for normally preventing said space thermostat from reducing the temperature of the air passing to said space below a predetermined value, a high limit thermostat also responsive to the temperature of the air heated by said heater and connected into said control line means for normally preventing the air passing to said space from rising above a predetermined temperature, and means actuated in response to the temperature in said space falling below a predetermined value for rendering said high limit thermostat ineffective to prevent the temperature of the air passing to said space from rising above said predetermined value.

10. In a system for heating a space, in combination, heating means for heating a heating medium being supplied to said space, motor means for controlling said heating means, thermostatic means responsive to space temperature, control line means between said motor means and said space thermostatic means, a high limit thermostat responsive to the temperature of the medium being supplied to said space, said high limit thermostat being connected into said control line means and operative to normally prevent the temperature of the heating medium from rising above a predetermined value irrespective of changes in space temperature, and means actuated upon fall in space temperature below a predetermined value for rendering said high limit thermostat ineffective to prevent the temperature of the heating medium from rising above said predetermined value.

11. In a system for heating a space, in combination, means for passing a stream of air to said space, a heater for heating the air stream, motor means for varying the output of said heater, a thermostat responsive to the temperature of the space, control line means between said thermostat and said motor means for rendering said thermostat effective to control said heater, a high limit thermostat responsive to the temperature of the air heated by said heater and connected into said control line means for normally preventing the air passing to said space from rising above a predetermined temperature irrespective of variations in space temperature, and means actuated in response to the temperature in said space falling below a predetermined value for rendering said high limit thermostat ineffective to prevent the temperature of the air passing to said space from rising above said predetermined value.

12. In a system for heating a space, in combination, means for passing a stream of air to said space, a heater for heating the air stream, electromagnetic means for varying the output of said heater, a control circuit for said electromagnetic means, thermostatic current controlling means responsive to the temperature of said space and connected into said control circuit for controlling said heater in a manner to maintain the space temperature within predetermined limits, a low limit thermostatic current controlling means connected into said control circuit for preventing the temperature of the air passing to said space from falling below a predetermined value, a high limit thermostatic current controlling means connected into said control circuit for normally preventing the temperature of the air passing to said space from rising above a predetermined value, and current controlling means connected into said control circuit and effective upon fall in space temperature to a predetermined value for rendering said high limit current controlling means ineffective to prevent the temperature of the air passing to the space from rising above said predetermined value.

13. In a system for heating a space, in combination, means for passing a stream of air to said space, a heater for heating the air stream, electromagnetic means for varying the output of said heater, a control circuit for said electromagnetic means, thermostatic current controlling means responsive to the temperature of said space and connected into said control circuit for controlling said heater in a manner to maintain the space temperature within predetermined limits, a high limit thermostatic current controlling means connected into said control circuit for normally preventing the temperature of the air passing to said space from rising above a predetermined value, and current controlling means connected into said control circuit and effective upon fall in space temperature to a predetermined value for rendering said high limit current controlling means ineffective to prevent the temperature of the air passing to the space from rising above said predetermined value.

ANDREW B. SIMON.